US006933351B2

(12) United States Patent
Michaud et al.

(10) Patent No.: US 6,933,351 B2
(45) Date of Patent: Aug. 23, 2005

(54) PROCESS FOR FORMING POLYALKENYL ACYLATING AGENTS

(75) Inventors: Vincent Jean Marie Michaud, Salon de Provence (FR); Jeremy Roger Spencer, East Hagbourne Didcot (GB); David Loughlin, Didcot (GB); David Gordon Birse, Kennington (GB)

(73) Assignee: Infineum International Limited (GB)

( * ) Notice: Subject to any disclaimer, the term of this patent is extended or adjusted under 35 U.S.C. 154(b) by 174 days.

(21) Appl. No.: 10/600,677

(22) Filed: Jun. 20, 2003

(65) Prior Publication Data

US 2004/0260027 A1 Dec. 23, 2004

(51) Int. Cl.$^7$ .............................................. C08C 19/36
(52) U.S. Cl. ................... 525/333.7; 525/386; 528/486; 508/534
(58) Field of Search .............................. 525/333.7, 386; 528/486; 508/534

(56) References Cited

U.S. PATENT DOCUMENTS

| | | | |
|---|---|---|---|
| 3,087,936 A | 4/1963 | Le Suer | 260/326.3 |
| 3,254,025 A | 5/1966 | Le Suer | 252/32.7 |
| 3,381,022 A | 4/1968 | Le Suer | 260/404.8 |
| 4,086,251 A | 4/1978 | Cengel et al. | 260/346.74 |
| 4,102,798 A | 7/1978 | Ryer et al. | 252/51.5 A |
| 4,113,639 A | 9/1978 | Lonstrup et al. | 252/51.5 A |
| 4,152,499 A | 5/1979 | Boerzel et al. | 526/52.4 |
| 4,234,435 A | 11/1980 | Meinhardt et al. | 252/51.5 A |
| 4,235,786 A | 11/1980 | Wisotsky | 260/346.74 |
| 4,472,588 A | 9/1984 | Keasey | 549/255 |
| 4,605,808 A | 8/1986 | Samson | 585/525 |
| 4,857,217 A | 8/1989 | Gutierrez et al. | 252/47 |
| 4,883,886 A * | 11/1989 | Huang | 549/255 |
| 4,927,551 A | 5/1990 | Erdman et al. | 252/42.7 |
| 4,938,881 A | 7/1990 | Ripple et al. | 252/32.7 E |
| 4,956,107 A | 9/1990 | Gutierrez et al. | 252/47 |
| 4,963,275 A | 10/1990 | Gutierrez et al. | 252/47 |
| 5,053,152 A | 10/1991 | Steckel | 252/51.5 R |
| 5,225,092 A | 7/1993 | Emert et al. | 252/50 |
| 5,229,022 A | 7/1993 | Song et al. | 252/56 R |
| 5,230,714 A | 7/1993 | Steckel | 44/432 |
| 5,241,003 A | 8/1993 | Degonia et al. | 525/123 |
| 5,266,223 A | 11/1993 | Song et al. | 252/51.5 A |
| 5,430,105 A | 7/1995 | Redpath et al. | 525/285 |
| 5,565,128 A | 10/1996 | Gutierrez | 508/542 |
| 5,674,955 A | 10/1997 | Kerr et al. | 526/77 |
| 5,756,431 A | 5/1998 | Emert et al. | 508/293 |
| 5,777,025 A | 7/1998 | Spencer et al. | 524/745 |
| 5,792,730 A | 8/1998 | Gutierrez et al. | 508/232 |
| 5,854,186 A | 12/1998 | Cusumano et al. | 508/554 |
| 6,562,904 B2 * | 5/2003 | Barini et al. | 525/129 |

FOREIGN PATENT DOCUMENTS

| | | | |
|---|---|---|---|
| EP | 0 208 560 B1 | 1/1993 | ........ C10M/129/93 |
| GB | 989409 | 4/1965 | |
| WO | WO01/19873 A1 | 3/2001 | ............. C08F/2/00 |

* cited by examiner

Primary Examiner—Roberto Rabago

(57) ABSTRACT

A process for producing polyalkenyl acylating agent, wherein, upon completion of the thermal reaction of a polyalkene and an unsaturated mono- or dicarboxylic acid or anhydride compound, the reaction mixture is allowed to cool to below the reaction temperature, an additional amount of unsaturated mono- or dicarboxylic acid or anhydride compound is added to the cooled reaction mixture, which is then maintained in the reactor for a time period, optionally with agitation. Reducing the temperature of the reaction mixture prior to the introduction of additional unsaturated mono- or dicarboxylic acid or anhydride compound minimizes further reaction between the additional unsaturated mono- or dicarboxylic acid or anhydride compound and any remaining unreacted polyalkene, as well as self-polymerization of the unsaturated mono- or dicarboxylic acid or anhydride compound. Polymerized unsaturated mono- or dicarboxylic acid or anhydride compound in the reactor, suspended in the reaction mixture in the form of sediment or deposited on the internal walls of the reactor vessel as tar, is dissolved by the additional unsaturated mono- or dicarboxylic acid or anhydride compound and removed from the reactor upon draining of the reactor vessel.

24 Claims, No Drawings

PROCESS FOR FORMING POLYALKENYL ACYLATING AGENTS

FIELD OF THE INVENTION

The invention relates to a thermal process for preparing oil-soluble polyalkenyl acylating agent by reaction of a polyalkene and an olefinic mono- or dicarboxylic acid or anhydride producing material, with reduced levels of reactor fouling. More specifically, the invention is directed to a batch reaction process wherein a mono- or dicarboxylic acid or anhydride producing compound, such as maleic anhydride, is thermally reacted with polyalkene, in which process, upon substantial completion of the reaction, the reaction mixture is allowed to cool, an additional amount of the olefinic mono- or dicarboxylic acid or anhydride producing compound is added to the cooled reaction mixture, and the mixture is allowed to remain in the reactor for a specified time period. The polyalkenyl acylating agents thus formed are useful per se as additives in lubricating oils, functional fluids, and fuels and also serve as intermediates in the preparation of other products (e.g., succinimides) useful as additives in lubricating oils, functional fluids, and fuels.

BACKGROUND OF THE INVENTION

Polyalkenyl substituted olefinic mono- and dicarboxylic acid or anhydride producing materials, most notably polyisobutenyl succinic acids and anhydrides, are known intermediates for the preparation of products useful as additives in lubricants, fuels, and functional fluids. In particular, polyalkenyl succinic anhydrides have been used as emulsifiers and compatibilizers, and succinamide and succinimide products produced by the reaction of monoamines or polyamines with polyalkenyl succinic anhydrides have been employed as ashless dispersants and detergent additives in lubricating oils and in fuels.

Polyalkenyl substituted olefinic mono- and dicarboxylic acid and anhydride producing materials have been prepared using a one-step halogen-assisted reaction process in which a polyalkene and an unsaturated olefinic mono- or dicarboxylic acid or anhydride producing compound (hereinafter referred to for the sake of convenience as "CAP compound (s)") are reacted at elevated temperature in the presence of chlorine. Such polyalkenyl dicarboxylic acid materials have also been prepared using a two-step halogen-assisted process in which the polyalkene is chlorinated in the first step and the resulting chlorinated polyalkene is then reacted with the CAP at elevated temperature. Both the one- and two-step chloro processes can produce polyalkenyl substituted dicarboxylic acid materials in relatively high yields. However, these products typically contain residual chlorine, and environmental concerns related to chlorine-containing materials make the use of the chloro processes undesirable.

The polyalkenyl substituted carboxylic materials have also been prepared by the direct thermal reaction of a polyalkene and CAP compound, often referred to in the art as the thermal (or "ene") process. While the thermal process has the advantage of avoiding the use of chlorine, the reaction tends to proceed only slowly and with low yields at reaction temperatures below about 150° C. At higher reaction temperatures, e.g., temperatures above 180° C., the yield of the thermal process improves.

Improved thermal process yields have been achieved using polyalkene reactants having a relatively high proportion of terminal double. Terminal double bonds, particularly terminal vinylidene bonds, in polyalkenes are recognized to be generally more reactive in the thermal process than internal double bonds. U.S. Pat. No. 4,152,499, for example, discloses that adduct formation between maleic anhydride and polyisobutene occurs virtually only between maleic anhydride and a terminal double bond. U.S. Pat. No. 4,152, 499 further discloses that double bonds in the β position are also capable of reacting to a certain degree, while virtually no reaction occurs at double bonds further removed from the chain ends. U.S. Pat. No. 4,086,251 discloses that terminal vinylidene is believed to be the most reactive of the terminal double bonds in polybutenes. Conventional polyisobutenes, formed by cationic polymerization using aluminum chloride catalysts such as $AlCl_3$, generally have a relatively low content of terminal double bonds. Polyisobutenes having a high content of terminal double bonds, so-called "reactive" polyisobutenes, have been achieved by $BF_3$-catalyzed polymerization of isobutene. Other polyalkenes having a high content of terminal double bonds (e.g., ethylene-α-olefin copolymers and α-olefin homo- and copolymers) prepared by polymerization of the corresponding monomers in the presence of metallocene catalyst systems have also been disclosed.

Both the halogen-assisted and thermal reactions described above also tend to produce significant amounts of a sediment byproduct which must be filtered from the final product prior to the use thereof as an additive or intermediate. The thermal process also tend to produce tars that coat the reactor walls, necessitating frequent, time-consuming, and costly cleanups of the reactor vessel. Sediments are believed to be due at least in part to the decomposition and/or self-polymerization of the CAP compound. Tar formation is believed to be due to the self-polymerization of the CAP compound, which is typically maleic anhydride.

In association with the practice of the thermal reaction, it is known that the use of a reactive polyalkene improves yield and reduces tar formation relative to a "conventional" polyalkene. Further, the use of certain process steps and the addition of certain additives are known to further reduce the formation of both tar and sediment. For example, U.S. Pat. No. 4,235,786 discloses that tar and sediment formation in such a thermal reaction can be reduced by conducting the reaction in the presence of an oil-soluble strong organic acid. U.S. Pat. No. 5,777,025 describes a process in which a thermal reaction is conducted at elevated temperature and pressure in the presence of a sediment-inhibiting amount of an oil soluble hydrocarbyl-substituted sulfonic acid. U.S. Pat. No. 4,472,588 describes a thermal reaction between a polyalkene and maleic anhydride, in which the maleic anhydride is added incrementally such that a single homogeneous phase is maintained in the reactor. The patent notes that such a process results in the formation of a reduced amount of resin (tar).

Reactor fouling by self-polymerized CAP compound reduces the rate of heat transfer between the reactor heating medium and the reactor contents. This results in prolonged cycle times and therefore, reduces plant capacity. Also the process by which the CAP compound self polymerize is auto-catalytic. Therefore, minimizing the presence of tar reduces the rate at which additional tar is formed. In extreme cases where reactor fouling leads to the formation of significant deposits, mechanical damage to mixing equipment and/or blockage of drain valves can result. While the use in a thermal reaction of reactive polymer has been found to reduce tar and sediment formation, and certain process steps and additives are known to further ameliorate both tar and sediment formation, it would be advantageous to find improved thermal processes that further reduce the amount, or completely eliminate sediment and/or tar, most particularly tar, such that the repetitive cleaning of the reactor becomes unnecessary. More specifically, while known processes may reduce the amount of tar formed, even minimal amounts of tar can build up on the reactor walls over time, fouling the reactor. Therefore, there remains a need for a process for thermally reacting polyalkene and CAP compound, which process is capable of both reducing the amount of tar formed in any single batch reaction, and removing from the reactor walls residual tar deposited on the reactor walls during prior reactions.

SUMMARY OF THE INVENTION

In accordance with a first aspect of the invention, there is provided a process for producing polyalkenyl acylating agent, wherein upon completion of the thermal reaction of the polyalkene and CAP compound, the reaction mixture is allowed to cool to below the reaction temperature, an additional amount of CAP compound is added to the cooled reaction mixture, which is then maintained in the reactor for a time period, with agitation. Reducing the temperature of the reaction mixture prior to the introduction of additional CAP compound minimizes further reaction between the CAP compound and remaining unreacted polyalkene, and self-polymerization of the CAP compound. Polymerized CAP compound in the reactor, suspended in the reaction mixture in the form of sediment or deposited on the internal walls of the reactor vessel as tar, is dissolved by the additional CAP compound and removed from the reactor upon draining of the reactor vessel.

In accordance with a second aspect of the invention, there is provided a process, as in the first, wherein the polyalkene is polybutene having a $M_n$ of 900 to 2500, and the CAP compound is maleic anhydride.

In accordance with a third aspect of the invention, there is provided a process, as in the first and second aspect, wherein the polyalkene is reactive polyalkene having a terminal vinylidene content of at least about 30%.

In accordance with a fourth aspect of the invention, there is provided a process, as in the first, second or third aspect, wherein the reactant CAP compound is stepwise added to the reaction mixture.

In accordance with a fifth aspect of the invention, there is provided a process, as in the first, second, third or fourth aspect, wherein the reaction is conducted in the presence of an amount of an oil soluble sulfonic acid effective to reduce tar.

In accordance with a sixth aspect of the invention there is provided a process as in the first, second, third, fourth or fifth aspect, wherein the polyalkene is reactive polyalkene having a terminal vinylidene content of at least about 30% and the reaction is conducted in the presence of an amount of a free radical inhibitor, such as a phenothiazine compound, to reduce sediment.

These and other objects, advantages and features of the present invention will be better understood by reference to the following detailed description of the preferred embodiments.

DETAILED DESCRIPTION OF THE INVENTION

Preferred polyalkenes are α-olefin homopolymers, α-olefin copolymers, and ethylene-α-olefin copolymers. The α-olefin homo- and copolymers are respectively polymers of one and of at least two $C_3$ to $C_{12}$ α-olefin(s) having the formula $CH_2$=CHR', wherein R' is a straight or branched chain alkyl radical comprising 1 to 10 carbon atoms. The unsaturated ethylene-α-olefin copolymers are polymers of ethylene and at least one α-olefin of the above formula. The α-olefins employed in the foregoing homo- and copolymers are more preferably selected from the $C_3$ to $C_6$ α-olefins of the above formula, R' being a straight or branched chain alkyl of from 1 to 4 carbon atoms. Accordingly, useful α-olefin monomers and comonomers include, for example, propene, butene-1, hexene-1, octene-1,4-methylpentene-1, decene-1, dodecene-1, and mixtures thereof (e.g., mixtures of propene and butene-1). Exemplary of such polymers are propene homopolymers, butene-1 homopolymers, ethylene-propene copolymers and the like. A preferred class of polymers are those derived from ethylene and the $C_3$ and $C_4$ α-olefins of the above formula; i.e., polyethylene, polypropene, polybutene-1, and copolymers of ethylene and propene, ethylene and butene-1, butene-1 and propene, and ethylene and propene and butene-1.

The molar ethylene content of the unsaturated ethylene copolymers employed in the process of this invention is preferably in the range of from about 20 to 80%, and more preferably from about 30 to 70%. When propene and/or butene-1 are employed as the comonomer(s) with ethylene, the ethylene content of such copolymers is most preferably between about 45 and 65%, although higher or lower ethylene contents may be present. Other suitable copolymers include those in which a minor amount of the copolymer (e.g., 1 to 20 mol. %) is derived from a $C_4$ to $C_{18}$ nonconjugated diolefin such as EPDM. EPDM copolymers include copolymers of ethylene and propylene with dicyclopentadiene, with ethylidene norbornene and with 1,4-hexadiene.

While the polyalkenes are generally hydrocarbon polyalkenes, suitable polyalkenes can contain non-hydrocarbon moieties such as lower alkoxy (lower is defined as groups having up to 7 carbon atoms), lower alkyl mercapto, hydroxy, mercapto and carbonyl, provided that the non-hydrocarbon moieties do not substantially interfere with the process of the invention; i.e., they do not interfere with the thermal reaction between the polyalkene and the enophile. The non-hydrocarbon moieties can be introduced into the polyalkene by employing polymerizable olefin monomers containing non-hydrocarbon substituents in the preparation of the polyalkene.

The polyalkenes have a number average molecular weight in the range of from about 300 to 5000 (e.g., 700 to 4000), preferably from about 450 to 3000 (e.g., 700 to 2500), and more preferably from about 900 to 2500 (e.g., 1000 to 2300). Number average molecular weight ($M_n$) can be determined by several known techniques such as gel permeation chromatography ("GPC"), vapor phase osmometry, proton NMR and carbon-13 NMR. GPC additionally provides molecular weight distribution ("MWD") information, also referred to in the art as polydispersity, which is determined by the ratio of weight average molecular weight ($M_w$) to $M_n$. MWD is not a critical aspect of the starting hydrocarbon polymer for the process of this invention. Typically, however, the polyalkenes have MWD of less than about 6. Particularly preferred polyalkenes are polyisobutenes and polybutenes having a number average molecular weight ($M_n$) of from about 450 to about 3000, more preferably from about 900 to 2500.

Reactive polyalkenes are differentiated from conventional polyalkenes by terminal vinylidene content. A polyalkene chain having a terminal vinylidene group (also referred to in the art as a terminal ethenylidene group) can be represented as POLY —C(R)=$CH_2$, wherein R is an alkyl group, the identity of which depends upon the monomer units from which the polyalkene is derived (e.g., R is methyl for polyisobutene), and POLY is the remainder of the polyalkene chain. The percentage of the polymer chains having terminal vinylidene and the percentages of other types of olefin unsaturation can be determined by proton, or carbon-13, NMR. Polyalkenes having at least about 30% (e.g., 40 to 100%) terminal vinylidene chains are classified as reactive polyalkenes, because such polyalkenes tend to have a higher reactivity when employed in a thermal process, relative to the analogous "conventional" polyalkene having a terminal vinylidene content of less than 30%. Preferably, at least 50%, more preferably at least 60%, and most preferably at least 75% (e.g., 75 to 98%) of such polymer chains exhibit terminal vinylidene unsaturation.

Reactive α-olefin homopolymers, α-olefin copolymers, and ethylene-α-olefin copolymers may be prepared by polymerizing an α-olefin monomer, or mixtures of α-olefin monomers, or mixtures comprising ethylene and at least one α-olefin monomer, in the presence of a catalyst system comprising at least one metallocene (e.g., a cyclopentadienyl-transition metal compound) and an aluminoxane compound. Suitable methods for preparing these polymers are disclosed in, for example, U.S. Pat. Nos 5,266,223 and 5,225,092. Reactive ethylene-α-olefin copolymers may be characterized by the formula POLY-C(R')=CH$_2$ wherein R' is as defined earlier and wherein POLY represents the polymer chain. The chain length of the R' alkyl group will vary depending upon the comonomer(s) selected for use in the polymerization. A minor amount of the polymer chains can contain terminal ethenyl (i.e., vinyl) unsaturation, i.e., POLY-CH=CH$_2$, and a portion of the polymers can contain internal monounsaturation, e.g., POLY-CH=CH(R').

Preferred reactive polyalkenes include reactive polyisobutenes (i.e., homopolymers of isobutene) and reactive polybutenes. The reactive polyisobutenes and polybutenes preferably have at least about 50% (e.g., 50 to 95%) and more preferably at least about 60% (e.g., 60 to 99%) terminal vinylidene chains. These reactive polyisobutenes and polybutenes may be formed via cationic polymerization using a boron trifluoride, and preferably a polar co-catalyst such as water or alcohol, and a shortened polymerization time. Methods by which reactive polyisobutenes and polybutenes can be prepared are described in more detail, for example, in U.S. Pat. Nos. 4,152,499; 4,605,808; 5,674,955 and WO 01/19873 A1. HR-PIB is commercially available under the tradenames Glissopal™ (from BASF), Ultravis™ (from BP-Amoco) and TPCxxxx, wherein xxxx represents various numbers indicative of molecular weight (from Texas Petrochemicals L.P.).

The CAP compound(s) comprise olefinic mono- and dicarboxylic acid or anhydride material, i.e., acid, anhydride, or acid ester material, including (i) monounsaturated $C_4$ to $C_{10}$ dicarboxylic acid wherein (a) the carboxyl groups are vicinyl, (i.e., located on adjacent carbon atoms) and (b) at least one, preferably both, of said adjacent carbon atoms are part of said mono unsaturation; (ii) derivatives of (i) such as anhydrides or $C_1$ to $C_5$ alcohol derived mono- or diesters of (i); (iii) monounsaturated $C_3$ to $C_{10}$ monocarboxylic acid wherein the carbon-carbon double bond is conjugated with the carboxyl group, i.e., of the structure —C=C—CO—; and (iv) derivatives of (iii) such as $C_1$ to $C_5$ alcohol derived mono- or diesters of (iii). Mixtures of CAP compounds (i) to (iv) also may be used. Upon reaction with the backbone, the monounsaturation of the reactant CAP compound becomes saturated. Thus, for example, maleic anhydride becomes backbone-substituted succinic anhydride, and acrylic acid becomes backbone-substituted propionic acid. Exemplary of such monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, and methyl fumarate. A particularly preferred CAP compound is maleic anhydride. The CAP compound reacted with the polyalkene may be the same or different from the CAP compound added subsequent to the reaction in accordance with the process of the invention.

Free radical inhibitors optionally added to the reaction mixture to reduce sediment formation where reactive polyalkenes are employed include phenol compounds such 2,6-di-tert-butylphenol, 2,4,6-tri-tert-butylphenol, 2,6-di-tert-butyl-4-methylphenol, 2,6-di-tert-butyl-4-ethylphenol, o-tert-butylphenol, 2-methyl-6-tert-butylphenol, 2,4,6-tri-tert-octylphenol, 2,4-dimethyl-6-tert-butylphenol, 2-tert-butyl-6-(α-methylbenzyl)phenol, 2,6-di(α-methylbenzyl) phenol, 2,4-di(α,α-dimethylbenzyl)phenol, 2,4-di-tert-octylphenol, 2,4,6-tri(α-methylbenzyl)phenol, 2,6-di-tert-butyl-4-hydroxy anisole, 2,6-di-tert-butyl-4-methoxyphenol, 2-methyl-6-cyclohexylphenol, 2,6-di-tert-α-dimethylamino-p-cresol), 2,6-di-tert-octyl-4-decoxyphenol, 2-tert-butyl-4-chlorophenol, 2,6-di-tert-butyl-4(N,N'-dimethylaminomethyl-phenol), 2,2'-methylene-bis(4-methyl-6-tert-butylphenol), 2,2'-methylene-bis(4-ethyl-6-tert-butylphenol), 2,2'-methylene-bis(4-methyl-6-nonylphenol), 2,2'-isobutylenebis(4,6-dimethylphenol), 2,2'methylenebis(4-methyl-6-cyclohexylphenol), 4,4'methylenebis(2,6-di-tert-butylphenol), 4,4'-bis(2,6-di-tert-butylphenol), 4,4'-bis(2-methyl-6-tert-butylphenol), 4,4'-butylenebis-(3-methyl-6-tert-butylphenol), 4,4'-isopropylidenebis(2,6-di-tert-butylphenol), 2,2'thiobis(4-methyl-6-tert-butylphenol), 4,4'-thiobis(2-methyl-6-tert-butylphenol), 4,4'-thiobis(3-methyl-6-tert-butylphenol), n-octadecyl-β-(4'-hydroxy-3'-5'-di-tert-butylphenol), propionate, bis(3-methyl-4-hydroxy-5-tert-butylbenzyl)sulfide, bis(3,5-di-tert-butyl-4-hydroxybenzyl) sulfide, and the like; phosphorus compounds, such as tri (nonylphenyl) phosphate, tridecyl phosphite, distearylpentaerithityl diphosphite, and the like; naphthol-based compounds, such as 1,2-dihydroxynaphthalene, 1-amino-2-naphthol, 1-nitro-2-naphthol, etc.; amine compounds, such as trimethylamine, phenyl-β-naphthylamine, p-phenylenediamine, mercaptoethylamine, N-nitrosodimethylamine, benzotriazoles, phenothiazine, halo-dihydro-2,2,4-trimethylquinone, and the like; or sulfur compounds, such as dilaurylthio dipropionate, dilauryl sulfide, 2-mercaptobenzimidazole, 2-mercaptobenzothiazole, dibenzothiazyl disulfide, metallic salts of 2-mercaptobenzothiazole, diethylxanthogene disulfite, etc.; quinoline compounds such as hydroquinone, urea compounds, etc. The above list is not intended to be exhaustive; numerous classes of compounds that inhibit formation of free radicals in organic materials are well known, and can be used in the practice of the present process. The free radical inhibitor can be a single compound, or a mixture of combination of such compounds. The preferred free radical inhibitors are the amine compounds, more preferably phenothiazine and substituted phenothiazine, most preferably phenothiazine.

Sulfonic acids used optionally to further suppress tar formation are oil soluble hydrocarbyl substituted sulfonic acids. The term "oil soluble" refers here to a hydrocarbyl substituted sulfonic acid which is at least 50 wt. % soluble in mineral oil at 20° C. The hydrocarbyl sulfonic acid may be a natural or synthetic sulfonic acid, such as a mahogany or petroleum alkyl sulfonic acid, an alkyl sulfonic acid or an alkaryl sulfonic acid, wherein the hydrocarbyl substituent (i.e., petroleum alkyl, linear and/or branched chain alkyl, alkaryl, and the like) imparts the oil solubility. Oil-soluble mahogany acids may be obtained by treating lubricating oil basestocks with concentrated or fuming sulfuric acid.

The hydrocarbyl substituent of the sulfonic acid can contain non-hydrocarbon groups such as nitro, amino, halo (e.g., chloro or bromo), lower alkoxy, lower alkyl mercapto, oxo (=O), thio (=S), imino (—NH—), ether (—O—), and thioether (—S—), provided the essentially hydrocarbon character of the substituent is retained for the purposes of this invention. When such non-hydrocarbon groups are present, they will generally represent no more than about 10 wt. % of the total weight of the atoms in the hydrocarbyl substituent.

The preferred hydrocarbyl substituent is alkaryl, and the preferred sulfonic acids are accordingly alkaryl sulfonic acids. Alkaryl sulfonic acids can be obtained by sulfonating alkyl substituted aromatic hydrocarbons such as those obtained from the fractionation of petroleum by distillation and/or extraction, or by the alkylation of aromatic hydrocarbons as, for example, those obtained by alkylating benzene, toluene, xylene, naphthalene, and biphenyl. Preferred alkaryl sulfonic acids include those obtained by the sulfonation of hydrocarbons prepared by the alkylation of benzene or toluene with tri-, tetra- or penta-propene fractions resulting from propene polymerization.

The alkaryl sulfonic acids typically contain from 15 to 76, preferably from 24 to 40, and more preferably from 28 to 36 total carbon atoms. The aryl moiety can be derived from any aromatic hydrocarbon such as benzene, napthalene, anthracene, biphenyl, and the like, but is preferably derived from benzene or naphthalene, and is most preferably derived from benzene. The preferred alkyl benzenesulfonic acids typically contain from 9 to 70, preferably from 18 to 34, more preferably from 22 to 30 total carbon atoms in the alkyl substituent (or substituents) in the aryl moiety. Particularly preferred is an alkylated benzenesulfonic acid having a number average molecular weight ($M_n$) of from 475 to 600 and an average of 2 alkyl groups wherein each of the alkyl groups contains an average of 11 to 15 carbon atoms.

The alkylated benzene used for preparing the sulfonic acid is obtained by known alkylation processes; e.g., the benzene can be reacted with a suitable alkene or oligomer or polymer thereof in the presence of boron trifluoride. Among the $C_9$ to $C_{70}$ alkylated benzenes which are preferably employed in the preparation of the sulfonic acid are nonylbenzene, dodecylbenzene, waxy alkylated benzenes, and benzenes alkylated with suitable branched chain polymers of up to 70 carbon atoms obtained from propene, butene, amylene or mixtures thereof or the like. Preferably, nonyl or dodecyl or either of their equivalents in a mixture of alkyls is employed in the preparation of the sulfonic acid.

The reaction between the polyalkene and the CAP compound is conducted in a batch reactor at a temperature of from about 180 to 300° C., preferably from about 210 to 250° C., and most preferably from about 220 to 245° C. (e.g., 225 to 235° C.), and under a pressure of from about 0 to 1000 kPag. Preferably, the reaction is conducted under a pressure of from about 0 to 700 kPag and more preferably from about 0 to 400 kPag. Where applied, partial pressure can be provided by charging the reactor with an inert gas.

The inert gas can be any gas which does not interfere with the thermal ene reaction under the selected reaction time and conditions. The gas is typically selected from one of the noble gases (i.e., helium, neon, and argon, etc.), nitrogen, carbon dioxide, and carbon monoxide. The preferred inert gases are nitrogen and $CO_2$, and nitrogen is the most preferred. Because gaseous byproducts and/or gaseous decomposition products of the reactants usually, though not always, form during the course of the reaction (e.g., $CO_2$ from the decomposition of maleic anhydride), the total system pressure is typically higher than the inert gas partial pressure.

The reaction time can vary greatly depending upon such factors as the reactivity of the polyalkene, the degree of conversion desired, the selected reaction temperature, and so forth. Nonetheless, the reaction time is generally in the range of from about 1 to 30 hours, and is more typically from about 2 to 10 hours (e.g., 4 to 8 hours).

The CAP compound and polyalkene are reacted in a molar ratio of CAP compound to polyalkene of from about 0.9:1 to 3:1 (e.g., 1:1 to 2.5:1), and preferably in a mole ratio of from about 1.3:1 to 2.5:1 (e.g., 1.4:1 to 2.2:1).

The mixture of reactants can be introduced into the reactor in any convenient manner prior to pressurizing and heating to reaction temperature. For example, the reactants can be individually charged to the reactor concurrently or sequentially in any order; or can be mixed together in a separate mixing vessel, followed by charging the mixture to the reactor. The polyalkene and CAP compound are normally in liquid form (e.g., polyalkenes and CAP compounds which are normally solid at room temperature are introduced as a melt at higher temperatures).

In another preferred embodiment, the CAP compound is added to the reactor in stages, such that an initial charge of CAP compound is contacted with the polyalkene at or prior to the beginning of the reaction, with one or more additional charges of CAP compound being introduced into the resulting reaction mixture subsequent to the beginning of the reaction.

In a further preferred embodiment, where the polyalkene is a reactive polyalkene, the reaction between the polyalkene and CAP compound is conducted in the presence of from about 10 to about 3000 ppm, preferably from about 10 to about 2000 ppm, more preferably from about 20 to about 500 ppm, based on the weight of reactive polyalkene charge, of free radical inhibitor.

In another preferred embodiment, the reaction between the polyalkene and CAP compound is conducted in the further presence of from about 10 to about 3000 ppm, preferably from about 10 to about 2000 ppm, more preferably from about 20 to about 500 ppm by weight, based on the weight of charged polyalkene, of an oil soluble sulfonic acid.

Both the free radical inhibitor and the oil soluble sulfonic acid can be introduced, together with the mixture of the polyalkene, CAP compound into the reactor. Alternatively, the free radical inhibitor and the oil soluble sulfonic acid can be charged to the reactor separately, be mixed together with the polyalkene in a separate mixing vessel, followed by charging the mixture to the reactor; or can be charged separately to the reactor, either concurrently with the charging of the CAP compound or sequentially in any order. Both the free radical inhibitor and the sulfonic acid are typically employed as a solid, liquid or, preferably, as a solution in an inert solvent (e.g., mineral oil) dissolved into one of the reactants in order to facilitate the mixing of the free radical inhibitor and/or sulfonic acid with the polyalkene. In a particularly preferred method, at least some, preferably at least 50 wt. %, of the sulfonic acid is charged to the reactor after completion of at least about 50% of the reaction between the polyalkene and the CAP compound has been completed. The free radical inhibitor can be also be added to the reaction mixture in stages, with an initial amount of free radical inhibitor being added prior to, or upon initiation of the reaction, with further charges of free radical inhibitor being introduced, in one or more additional charges, during the reaction.

Upon substantial completion of the reaction (e.g., at least about 25, preferably at least about 50, more preferably at least about 75, such as from about 80 to 100% of theoretical, or when the desired saponification (SAP) number is achieved), the reaction mixture is allowed to cool to a temperature at which the rate of reaction between the polyalkene and CAP compound is less than or equal to about 40%, preferably less than or equal to about 25% of peak rate of reaction. For reactions between polyalkenes and CAP compounds, the peak reaction rate corresponds substantially to the rate of reaction at the highest temperature reached within the reactor and, at temperatures of from about 210 to 250° C. each 10° C. of cooling will reduce the reaction rate about 50%. Once the reaction has cooled, an additional amount (e.g., about 1 to 10 wt. %, preferably from about 1 to 6 wt. %, based on the weight of polyalkene charged to the reactor) of CAP compound is added, preferably with stirring, and the cooled reaction mixture to which the additional amount of CAP compound has been added is allowed to remain in the reactor for a period of time sufficient to allow tar and sediment to dissolve in, or be dissolved by, the additional amount of CAP compound. Preferably the cooled reaction mixture to which the additional amount of CAP compound has been added remains in the reactor at least about 0.2 hours, such as from about 0.3 to about 6 hours, preferably from about 0.4 to about 3 hours, more preferably from about 0.5 to about 1 hour. Preferably, the reaction mixture is cooled to below 210° C. (e.g. to a temperature of from about 120 to about 200° C.) prior to the introduction of the additional amount of CAP compound. Below 210° C., the tendency of the CAP compound to self-polymerize is minimized. Further, it is preferable, from a safety standpoint, to introduce the additional amount of CAP compound at a temperature below the boiling point thereof.

After allowing the cooled reaction mixture to which the additional amount of CAP compound has been added to sit within the reactor for the noted time, excess CAP compound, volatile byproducts and decomposition products can be stripped, such as by nitrogen stripping or by distillation with or without a vacuum, hydrocarbon solvent can be added to reduce viscosity and precipitate tar and/or sediment, and preferably, the resulting mixture is filtered. The resulting product mixture typically contains the desired polyalkene derivative (i.e., polyalkenyl substituted CAP compound) and at least some unfunctionalized polyalkene. The unfunctionalized polyalkene is normally not removed from the product mixture, because such removal is difficult and would be expensive to achieve on a commercial scale.

The product mixture can be characterized in terms of its functionality, which is the average number of moles of CAP compound which have reacted per mole of polyalkene charged to the reaction, whether it has undergone functionalization or not. Functionality is based upon the saponification number ("SAP") of the product mixture and the $M_n$ of the polyalkene charged. SAP is the number of milligrams of KOH consumed in the complete neutralization of one gram of the resulting product mixture, and can be determined using ASTM D94.

The average number of succinic-groups per mole of product mixture obtained when reacting maleic anhydride with polyalkene is determined using the following formula:

$$F = (SAP \times M_n)/((112,200 \times A.I.) - (SAP \times 98))$$

wherein SAP is the saponification number; $M_n$ is the number average molecular weight of the starting olefin polymer; and AI is the percent active ingredient of the succinic-containing reaction product (the remainder being unreacted olefin polymer, maleic anhydride and diluent). The functionality of the polyalkenyl derivatives resulting from the process of the invention is typically at least about 0.5 and preferably at least about 0.7 (e.g., at least about 0.9). Functionality is typically in the range of from about 0.7 to 2 (e.g., 0.9 to 2). In one preferred embodiment the functionality is in a range from about 1 to 2 and preferably from about 1.3 to about 1.7 (e.g., 1.3 to 1.6), more preferably from about 1.3 to about 1.5.

The product mixture can also be characterized in terms of its active ingredient ("AI"), which, as described above, is the weight fraction of reacted polyalkene based on the total weight of reacted and unreacted polyalkene. The AI of the resulting product mixture is typically at least about 0.65 (e.g., 0.65 to 0.80), preferably at least about 0.75 (e.g., 0.75 to 0.90), more preferably at least about 0.80 (e.g., 0.85 to 0.99). AI can be determined by separating the functionalized and unfunctionalized polymer components using column chromatography and then determining the weight fractions of the separated components.

The products of the process of the invention are useful per se as additives in lubricating oils, fuels, and functional fluids, but are more typically employed as intermediates for producing additives. The polyalkenyl derivatives can, for example, be derivatized with a nucleophilic reactant, such as an amine, amino-alcohol, alcohol, metal compound, or mixture thereof, to form a corresponding derivative. Useful amine compounds for derivatizing functionalized polymers comprise at least one amine and can comprise one or more additional amine or other reactive or polar groups. These amines may be hydrocarbyl amines or may be predominantly hydrocarbyl amines in which the hydrocarbyl group includes other groups, e.g., hydroxyl groups, alkoxyl groups, amide groups, nitriles, imidazoline groups, and the like. Particularly useful amine compounds include mono- and polyamines, e.g., polyalkene and polyoxyalkylene polyamines of about 2 to 60, such as 2 to 40 (e.g., 3 to 20) total carbon atoms having about 1 to 12, such as 3 to 12, preferably 3 to 9, most preferably form about 6 to about 7 nitrogen atoms per molecule. Mixtures of amine compounds may advantageously be used, such as those prepared by reaction of alkylene dihalide with ammonia. Preferred amines are aliphatic saturated amines, including, for example, 1,2-diaminoethane; 1,3-diaminopropane; 1,4-diaminobutane; 1,6-diaminohexane; polyethylene amines such as diethylene triamine; triethylene tetramine; tetraethylene pentamine; and polypropyleneamines such as 1,2-propylene diamine; and di-(1,2-propylene)triamine. Such polyamine mixtures, known as PAM, are commercially available. Particularly preferred polyamine mixtures are mixtures derived by distilling the light ends from PAM products. The resulting mixtures, known as "heavy" PAM, or HPAM, are also commercially available. The properties and attributes of both PAM and/or HPAM are described, for example, in U.S. Pat. Nos. 4,938,881; 4,927,551; 5,230,714; 5,241,003; 5,565,128; 5,756,431; 5,792,730; and 5,854,186.

Other useful amine compounds include: alicyclic diamines such as 1,4-di(aminomethyl) cyclohexane and heterocyclic nitrogen compounds such as imidazolines. Another useful class of amines is the polyamido and related amido-amines as disclosed in U.S. Pat. Nos. 4,857,217; 4,956,107; 4,963,275; and 5,229,022. Also usable is tris (hydroxymethyl)amino methane (TAM) as described in U.S. Pat. Nos. 4,102,798; 4,113,639; 4,116,876; and UK 989,409. Dendrimers, star-like amines, and comb-structured amines may also be used. Similarly, one may use condensed amines, as described in U.S. Pat. No. 5,053,152. The functionalized polymer is reacted with the amine compound using conventional techniques as described, for example, in U.S. Pat. Nos. 4,234,435 and 5,229,022, as well as in EP-A-208,560.

A preferred dispersant composition is one comprising at least one polyalkenyl succinimide, which is the reaction product of a polyalkenyl substituted succinic anhydride (e.g., PIBSA) and a polyamine that has a coupling ratio of from about 0.65 to about 1.25, preferably from about 0.8 to about 1.1, most preferably from about 0.9 to about 1. In the context of this disclosure, "coupling ratio" may be defined as a ratio of the number of succinyl groups in the PIBSA to the number of primary amine groups in the polyamine reactant.

Low haze and low free-amine polyamine-derivatized polyalkenyl substituted succinic anhydrides are very difficult to obtain at low coupling ratios. It has been found that problems associated with haze and free amine content can be effectively addressed by modifying the rate and sequence of the amination reaction. Specifically, it has been found that a faster amination (a faster rate of polyamine reactant addition to the polyalkenyl substituted succinic anhydride solution) of less than about one hour, preferably 15 minutes or less, eliminates haze problems in dispersants that are provided by reacting polyamine and polyalkenyl substituted succinic anhydrides in a polyalkenyl substituted succinic anhydride to polyamine molar coupling ratio of less than about 1.0, such as less than about 0.9, preferably less than about 0.8. Cooling the polyamine-derivatized polyalkenyl substituted succinic anhydride solution to less than 140° C., preferably to less than about 120° C., more preferably to about 60 to 110° C., and maintaining this temperature for at least about 5 hours, preferably from about 5 to about 720 hours, has been found to effectively reduce to low levels the amount of free amine.

The functionalized, oil-soluble polymeric hydrocarbon backbones may also be derivatized with hydroxy compounds such as monohydric and polyhydric alcohols, or with aromatic compounds such as phenols and naphthols. Preferred polyhydric alcohols include alkylene glycols in which the alkylene radical contains from 2 to 8 carbon atoms. Other useful polyhydric alcohols include glycerol, monooleate of glycerol, monostearate of glycerol, monomethyl ether of glycerol, pentaerythritol, dipentaerythritol, and mixtures thereof. An ester dispersant may also be derived from unsaturated alcohols, such as allyl alcohol, cinnamyl alcohol, propargyl alcohol, 1-cyclohexane-3-ol, and oleyl alcohol. Still other classes of alcohols capable of yielding ashless dispersants comprise ether-alcohols, including oxyalkylene and oxy-arylene. Such ether-alcohols are exemplified by ether-alcohols having up to 150 oxy-alkylene radicals in which the alkylene radical contains from 1 to 8 carbon atoms. The ester dispersants may be di-esters of succinic acids or acid-esters, i.e., partially esterified succinic acids, as well as partially esterified polyhydric alcohols or phenols, i.e., esters having free alcohols or phenolic hydroxy radicals. An ester dispersant may be prepared by any one of several known methods as described, for example, in U.S. Pat. No. 3,381,022.

When forming a dispersant product, the functionalized, oil-soluble polymeric backbone is typically derivatized in diluent oil. As lubricating oil compositions are increasingly being required to be low in sulfur, and the diluent oil remains associated with the dispersant product, it is preferable to use a low sulfur diluent oil, or more preferably, diluent oil that is substantially free (e.g. less than 2 wt. %, such as less than 1.5 wt. %) or completely free from sulfur.

The resulting dispersant(s) are preferably non-polymeric (e.g., are mono- or bis-succinimides) and may optionally be borated. Such dispersants can be borated by conventional means, as generally taught in U.S. Pat. Nos. 3,087,936, 3,254,025 and 5,430,105. Boration of the dispersant is readily accomplished by treating an acyl nitrogen-containing dispersant with a boron compound such as boron oxide, boron halide boron acids, and esters of boron acids, in an amount sufficient to provide from about 0.1 to about 20 atomic proportions of boron for each mole of acylated nitrogen composition.

EXAMPLES

Using a stainless steel walled batch reactor, four consecutive batch reactions were conducted wherein 1000 g (0.44 mols) of polyisobutene and 81 g (0.82 mols) maleic anhydride were reacted, with stirring for 8 hours, at a pressure that varied from 0 to 250 kPa and a peak reaction temperature of 230° C., to provide a succinimide reaction product. Upon completion of the reaction, the reaction mixture was subjected to vacuum stripping to remove excess maleic anhydride and the resulting reaction product was filtered. For each of the batches, filtered sediment was measured and reactor cleanliness was visually determined. The results are shown in Table 1.

TABLE 1

| | Batch No. | | | |
| --- | --- | --- | --- | --- |
| | Comp. 1 | Comp. 2 | Comp. 3 | Comp. 4 |
| Sediment (vol. %) | 0.10 | 0.20 | 0.60 | 0.65 |
| Visual Reactor Fouling (%) | 12 | 32 | 47 | 63 |
| SAP (mgKOH/g) | 56.9 | 57.2 | 57.2 | 56.1 |
| Active Matter (AI) (mass %) | 86.3 | 86.0 | 85.2 | 84.7 |

Five consecutive batch reactions were then conducted as above, except that upon completion of the reaction the reaction mixture was cooled to 195° C. and 21 g (0.21 mols; 2.1 wt. % of charged polyisobutene) of additional maleic anhydride were introduced into the reaction mixture. After introduction of the additional maleic anhydride, the reaction mixture was allowed to sit within the reactor for 0.5 hours with continued agitation. The mixture was then subjected to vacuum stripping, and the resulting product was filtered. For the each of the batches, filtered sediment was measured and reactor cleanliness was visually determined in the same manner as above. The results are shown below, in Table 2:

TABLE 2

| | Batch No. | | | | |
|---|---|---|---|---|---|
| | Inv. 1 | Inv. 2 | Inv. 3 | Inv. 4 | Inv. 5 |
| Sediment (vol. %) | 0.15 | 0.30 | 0.40 | 0.45 | 0.45 |
| Visual Reactor Fouling (%) | 16 | 28 | 32 | 35 | 35 |
| SAP (mg KOH/g) | 58.0 | 58.7 | 58.5 | 57.3 | 57.4 |
| Active Matter (AI) (vol. %) | 86.8 | 87.1 | 86.4 | 86.6 | 86.5 |

From the data of Table 1, it can be seen that, in the absence of the introduction of additional maleic anhydride, the amount of sediment in the product drained from the reactor, as well as the degree of reactor fouling, continue to increase with each consecutive batch, and as a result of the reactor fouling, the amount of active matter for a given SAP drops. In contrast, for the batches completed with introduction of additional maleic anhydride (Table 2), both the amount of sediment and degree of reactor fouling increase initially, but thereafter level off and remain substantially constant (as does AI).

The disclosures of all patents, articles and other materials described herein are hereby incorporated, in their entirety, into this specification by reference. A description of a composition comprising, consisting essentially of, or consisting of a plurality of defined components should be construed to further include compositions that result from the admixture of said defined components. The principles, preferred embodiments and modes of operation of the present invention have been described in the foregoing specification. What applicants submit is their invention, however, is not to be construed as limited to the particular embodiments disclosed, since the disclosed embodiments are regarded as illustrative rather than limiting. Changes may be made by those skilled in the art without departing from the spirit of the invention.

What is claimed:

1. A batch reaction process for producing polyalkenyl acylating agent comprising reaction of at least one polyalkene and at least one mono- or dicarboxylic acid or anhydride producing compound at a reaction temperature of from about 180° C. to about 300° C., wherein upon at least substantial completion of said reaction, the reaction mixture is allowed to cool to a temperature at which the reaction rate between the polyalkene and the mono- or dicarboxylic acid or anhydride producing compound is no more than about 40% of the peak reaction rate during said reaction, additional amount of olefinic mono- or dicarboxylic acid or anhydride producing compound is added to the cooled reaction mixture, and the resulting mixture is maintained in the reactor for a period of time to cause solubilization of reactor tar.

2. The process of claim 1, wherein said reaction temperature is from about 210° C. to about 250° C.

3. The process of claim 1, wherein said reaction is conducted at a pressure of from about 0 to about 1000 kPag.

4. The process of claim 3, wherein said pressure is from about 0 to about 400 kPag.

5. The process of claim 1, wherein the polyalkene and mono- or dicarboxylic acid or anhydride producing compound are reacted in a molar ratio of from about 0.9:1 to about 3:1.

6. The process of claim 5, wherein said molar ratio is from about 1.6:1 to about 2.4:1.

7. The process of claim 1, wherein said polyalkene has a number average molecular weight of from about 300 to about 5000.

8. The process of claim 1, wherein said polyalkene has a number average molecular weight of from about 900 to about 2500.

9. The process of claim 7, wherein said polyalkene is polyisobutene.

10. The process of claim 7, wherein said polyalkene has a terminal vinylidene content of at least about 30%.

11. The process of claim 7, wherein said polyalkenyl acylating agent has a functionality of from about 1 to about 2.

12. The process of claim 11, wherein said functionality is from about 1.3 to about 1.7.

13. The process of claim 1, wherein said mono- or dicarboxylic acid or anhydride producing compound is maleic anhydride.

14. The process of claim 1, wherein the reactant mono- or dicarboxylic acid or anhydride producing compound is introduced into the reactor in multiple stages.

15. The process of claim 1, wherein the reaction is conducted in the presence of an amount of an oil soluble sulfonic acid.

16. The process of claim 15, wherein said sulfonic acid is introduced into said reactor after at least 50% of the polyalkene has reacted with said mono- or dicarboxylic acid or anhydride producing compound.

17. The process of claim 10, wherein said reaction is conducted in the presence of an amount of a free radical inhibitor.

18. The process of claim 17, wherein said free radical inhibitor is substituted or unsubstituted phenothiazine.

19. The process of claim 1, wherein said additional amount of mono- or dicarboxylic acid or anhydride producing compound is from about 1 wt. % to about 10 wt. %, based on the weight of polyalkene reactant.

20. The process of claim 1, wherein the resulting mixture is maintained in the reactor for a period of time of from about 0.5 to about 1 hour.

21. The process of claim 1 comprising at least one of the further steps of stripping excess mono- or dicarboxylic acid or anhydride producing compound, adding a hydrocarbon solvent, and filtering the reaction product.

22. The process of claim 21 comprising the reacting of the reaction product with a nucleophilic reactant.

23. The process of claim 22, wherein said nucleophilic reactant is selected from the group consisting of amine, alcohol, amino-alcohol, metal compound, and mixtures thereof.

24. The process of claim 23, wherein the reaction product is reacted with the nucleophilic reactant in diluent oil that is at least substantially free from sulfur.

* * * * *